Figure 1:
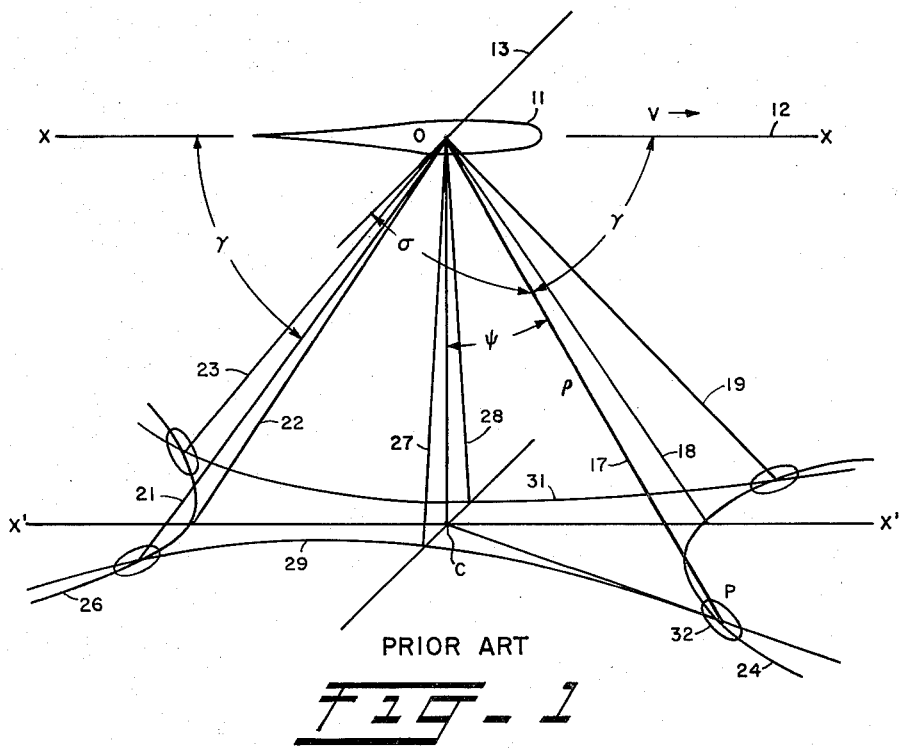

Aug. 1, 1961    G. STAVIS ET AL    2,994,875
SLOT ARRAY ANTENNA HAVING FOUR PRINCIPAL BEAMS, USEFUL
FOR DOPPLER AIR NAVIGATION
Filed May 26, 1959    3 Sheets-Sheet 1

INVENTOR.
GUS STAVIS
GEORGE R. GAMERTSFELDER
BY

ATTORNEY

*INVENTOR.*
GUS STAVIS
GEORGE R. GAMERTSFELDER

INVENTORS.
GUS STAVIS
GEORGE R. GAMERTSFELDER
BY
*H. S. Mackey*
ATTORNEY.

United States Patent Office 2,994,875
Patented Aug. 1, 1961

2,994,875
SLOT ARRAY ANTENNA HAVING FOUR PRINCIPAL BEAMS, USEFUL FOR DOPPLER AIR NAVIGATION
Gus Stavis, Briarcliff Manor, and George R. Gamertsfelder, Pleasantville, N.Y., assignors to General Precision, Inc., a corporation of Delaware
Filed May 26, 1959, Ser. No. 815,856
1 Claim. (Cl. 343—771)

This invention relates to microwave antennas for use in continuous wave and pulsed Doppler radio systems, and relates more particularly to antennas which reduce calibration shifts caused by altitude "holes," by sea reflection, or by both.

When microwave radiation is reflected from a water surface the amount of energy returned to the receiver-transmitter depends not only on the distance but also on the angle of incidence of the radiation at the water surface, being much reduced at acute angles to the horizontal direction. This is termed the sea reflection effect. When pulsed microwave echoes are received by the receiver-transmitter, which is gated off during the transmission of a pulse, those parts of the echoes which arrive at the receiver when it is gated off, are lost. This is termed the altitude hole effect.

Both the altitude hole effect and the sea return effect cause signal reduction and, what is more important, cause errors in the Doppler information in the echoes by selective attenuation of frequencies composing the Doppler spectrum.

Both types of error are observed as an apparent change in the receiver-transmitter calibration, the change being termed calibration shift. For example, if the receiver-transmitter is part of an aircraft navigation system measuring aircraft ground speed, the ratio between the Doppler difference frequency and the indicated ground speed is the calibration constant and apparent changes in this constant due to altitude hole and sea effects are termed calibration shifts. Such errors can amount to as much as 5% and, if not neutralized, greatly impair the usefulness of the system.

Methods heretofore employed for neutralizing calibration shift include frequency modulation of the pulse repetition rate (which reduces altitude hole effect but not sea reflection effect), alternating use of two lobes or beams of radiation, and variations of the antenna design. The present invention falls in the last category. Its method is approximate but so nearly exact as to reduce calibration shift by one or two orders of magnitude.

In one form of the invention a horizontal planar array consists of rings of radiators, the rings being arranged in a straight row of rings so that each ring is an element in a linear array. The radiation pattern on the ground is then a combination of a ring pattern concentric about a vertical axis and a hyperbolic pattern intersecting the ring. At the line of intersection the two sets of radiation are in phase and constitute a narrow beam of radiation. By extension of this design three or four such beams, requisite for a complete navigation system, can be generated. Beams so generated have the peculiar property of being insensitive to the described aberrations, so that their echoes are nearly free of calibration shift due to altitude hole and sea reflection effects.

One purpose of this invention is to provide a microwave antenna radiating and receiving beams which cause little or no altitude hole or sea return calibration shift.

Another purpose is to provide an antenna design radiating and receiving beams, each element of each beam having an intensity dependent on the angle of incidence at the earth and also separably dependent on the angle which the beam element makes with the longitudinal antenna axis.

Another purpose is to provide an antenna design composed of a number of units in a single linear array, each unit being composed of a number of concentric circles and each circle being composed of a number of elemental radiators.

Figure 3:
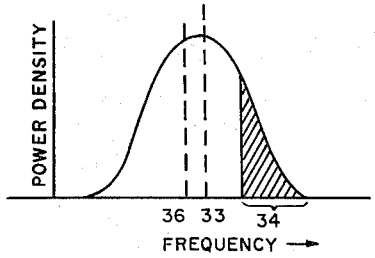
Figure 2:
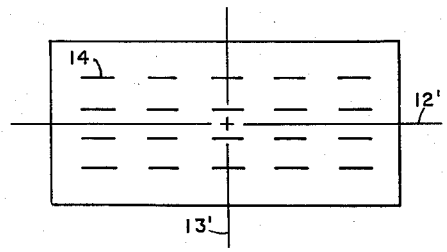
Figure 5:
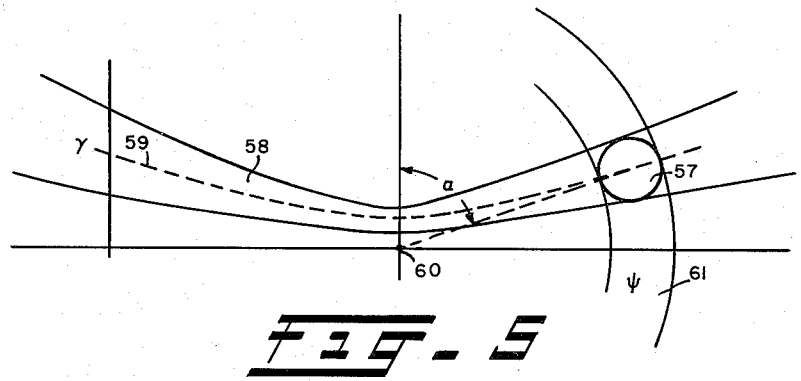
Figure 6:
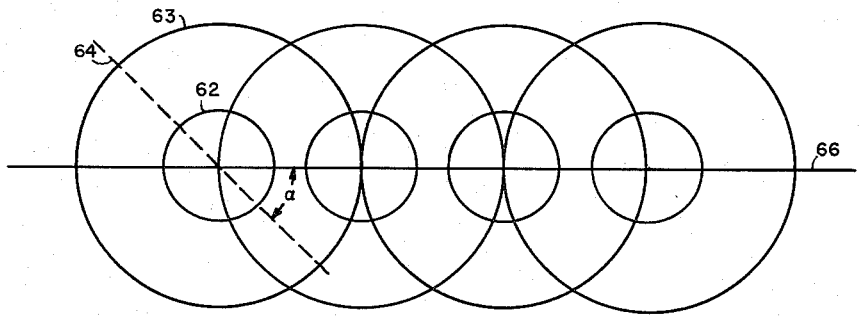
Figure 4:
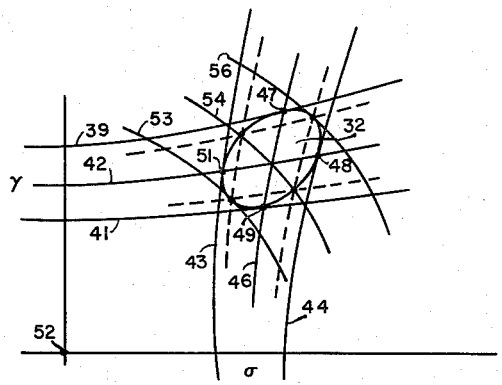
Figure 7:
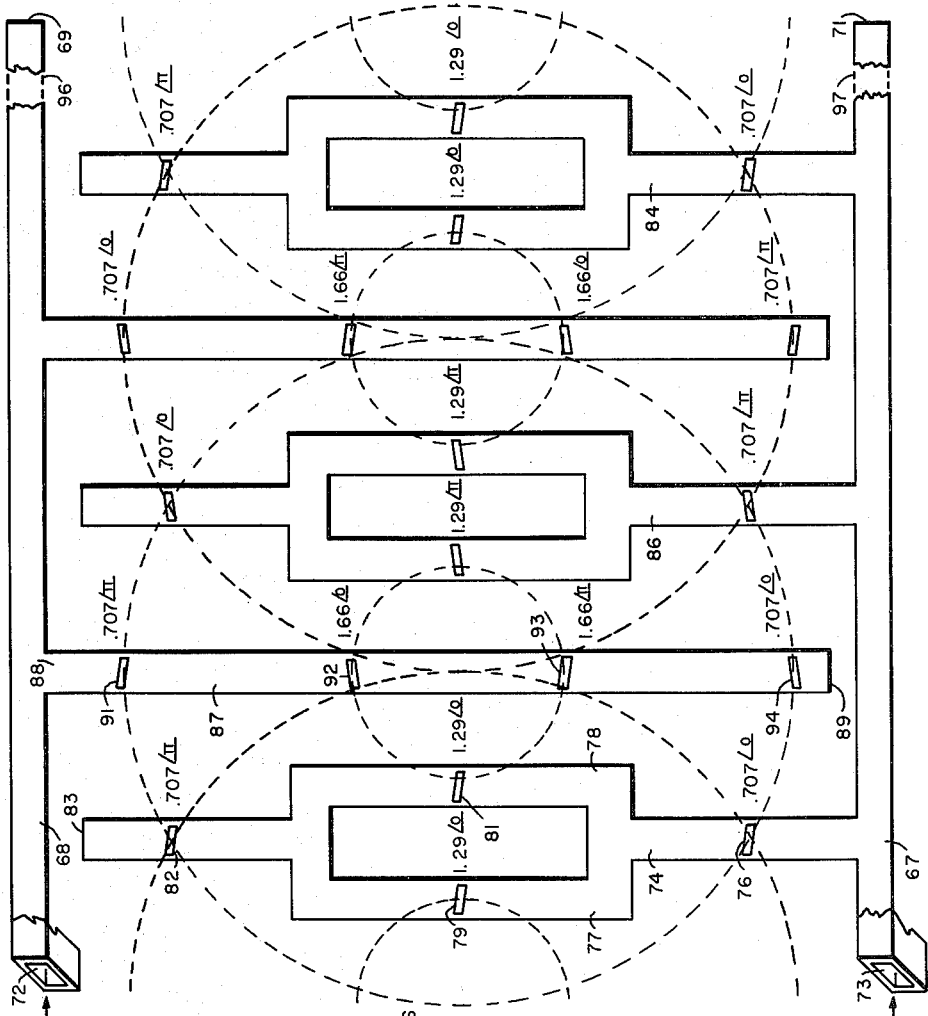
Figure 7:
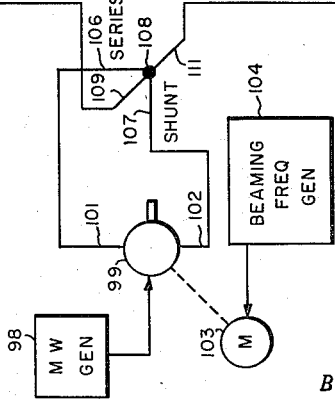

A further understanding of this invention may be secured from the detailed description and drawings, in which:

FIGURE 1 depicts the spatial relations of the radiated beams.
FIGURE 2 is a plan of an antecedent planar microwave antenna.
FIGURE 3 is a frequency versus power density graph of a Doppler echo spectrum.
FIGURE 4 is a ground irradiation plan view illustrating the cause of calibration shifts when using precedent antenna designs.
FIGURE 5 is a ground irradiation plan view illustrating the absence of calibration shifts when using the instant antenna.
FIGURE 6 illustrates the principles of design of the instant antenna.
FIGURE 7 depicts one design embodying the principles of the instant antenna.

Referring now to FIG. 1, an aircraft 11 is pictured in level flight with velocity V in the direction of the horizontal X-axis 12. The aircraft contains microwave Doppler navigational equipment for measuring ground speed along the ground track $x'—x'$. For simplicity of description, the microwave antenna is stabilized to a horizontal plane with the longitudinal axis of the antenna parallel to the ground track.

It is convenient and sufficient to employ a horizontally-stabilized antenna in describing the principles of this invention, but the invention is not restricted to such use.

One form of microwave antenna precedent to this invention is shown in FIG. 2, consisting of a planar face with orthogonal axes $12'$ and $13'$, and individual radiators 14 arranged in straight longitudinal and lateral rows. The antenna is positioned in the aircraft with its active face in a horizontal plane facing the earth. The longitudinal rows of radiators constitute linear arrays arranged and fed to emit a pair of hollow semi-cones of radiation having axis $12'$ as the axis of both, with open ends pointing forward and aft. Elements of these cones, having the cone half-angle $\gamma$, are shown in FIG. 1 by the rays 17, 18, 19, and 21, 22, 23. These cones intersect the earth in the hyperbolas 24 and 26. The transverse rows also constitute linear arrays, and emit a pair of hollow semi-cones with the cone half-angle $\sigma$, pointing right and left. Elements of these cones are shown as lines 21, 27 and 17, of the right cone, and as lines 23, 28 and 19, of the left cone. These cones intersect the earth in the hyperbolas 29 and 31.

The space phases of the four cones are such that they are equal at the rays 17, 19, 23 and 21, while elsewhere they are opposed in part or completely. Therefore these four rays are the centers of four narrow beams constituting practically all of the radiation. Under the described conditions the incident angles of these four rays are equal. This angle is termed $\psi$ and is depicted in FIG. 1 for the ray 17.

In such a Doppler microwave system the purpose of beaming microwave energy to the earth and receiving the reflected energy is to secure Doppler difference frequency information from these reflections or echoes, from which the aircraft speed in its velocity direction relative to the earth may be calculated. The relation between the Doppler frequency shift $\nu$ in a beam echo, the aircraft ground speed V and the angle $\gamma$ is $$\nu = \frac{2V}{\lambda} \cos \gamma \tag{1}$$

in which $\lambda$ is the radio wavelength employed.

Doppler navigation systems generally measure drift angle as well as ground speed. The beaming system illustrated in FIG. 1, for example, does this by transmitting first one pair of the four beams, then the other pair, at a rate of, say, ten cycles per second. By pairing the right-front and left-rear beams, and measuring the received frequency difference, then measuring the frequency difference received from the other pair, the antenna can be servoed to point along the ground track.

Reflection of microwave energy from water is far from isotropic, so that, in the triangle OPC, the amplitude of the echo varies as some function of the cosine of the angle $\psi$. Thus sea return effect affects the signal as a function of $\psi$.

Pulsed microwave systems employ receivers which are gated off or made inoperative during the transmitting pulse time. When the travel time of microwave energy along the slant range OP is such that the returned energy, or part of it, reaches the receiver during its inoperative time, all or part of the signal is lost. But the beam 17, although narrow, is several degrees wide, as indicated by the irradiated area 32. Since the slant ranges $\rho$ to various parts of this area are different, the times of reception of the echoes are different, and depend on the slant range angle $\psi$ and the altitude $h$, as follows $$\rho = \frac{h}{\cos \psi} \tag{2}$$

A variation in $\psi$ may be accompanied by a variation in $\gamma$, and in general it is so accompanied. That is, the received signal amplitude is an inseparable function of $\psi$ and $\gamma$. In particular this is true of the pattern of the antenna of FIG. 2. Therefore, at certain altitudes at which the received spectrum is partly within and partly outside of the receiver-off time gate, the average $\gamma$ angle is somewhat different from that when the spectrum is wholly outside the time gate. This in turn causes an apparently different calibration in the two cases. Thus the altitude hole effect affects the signal as a function of $\psi$.

In Doppler radios the received frequency spectrum is very broadband, having the approximately Gaussian form of FIG. 3. The receiver includes means to find the average or center spectrum frequency 33. Since the echo frequency changes with aircraft speed, this center frequency must be followed or tracked as the speed changes. The receiver component which finds and tracks this center frequency is termed the frequency tracker. When the entire Gaussian spectrum is received, the frequency tracker finds and tracks the median frequency 33, but when, because of sea return or altitude hole effect a portion, such as the cross-hatched part 34 of the spectrum, is missing or attenuated the frequency tracker finds the center frequency 36 of what remains of the spectrum. This difference between the frequencies 33 and 36 causes the calibration shift.

Antennas of earlier design generally are subject to calibration shift. This is because of the interdependent relations of the angles $\gamma$ and $\psi$. This is graphically shown in FIG. 4. This figure depicts the earth irradiation plan, approximately to scale, when $\gamma = \psi = 65°$. The lines 39 and 41 represent the 3-db power limits of the forward hollow semi-cone of radiation having an average $\gamma$ angle of 65° at the center line 42, at which the radiation amplitude is maximum. The lines 43 and 44 represent the 3-db power limits of the right side hollow semi-cone of radiation having an average $\sigma$ angle of 65° at the maximum amplitude center line 46. The egg-shaped area 32 represents the inphase power product defined by the points 47, 48, 49 and 51.

Successive $\psi$ angles are represented by the circles of constant $\psi$ with center 52, numbered 53, 54 and 56. It is evident that the median $\gamma$ line 42 intersects the center of the area 32, and that the average $\gamma$ angle along any circle within area 32 differs from that of line 42 except at the area center. That is, the amplitude is an inseparable function of $\psi$ and $\gamma$, for if a strip between two $\psi$ lines be removed, the line 42 will not pass through the center of the remaining area. Thus varying $\psi$ varies the median center frequency. But passing from land reflection to water reflection varies the amplitude over the area as a function of $\psi$ and at the edge of an altitude hole the amplitude over the area again varies as a function of $\psi$. Thus both sea reflection and altitude holes vary the frequency distribution of the echo spectrum.

Recapitulating, the precedent antenna beam can be described as having intensity which is an inseparable function of $\psi$ and $\gamma$. Since both sea return effect and altitude hole effect are functions of $\psi$, and changes in $\psi$ affect the effective $\gamma$ because they are inseparable functions, these effects cause large changes in the average measured Doppler frequency.

The antenna of the present invention emits microwave beams in each of which the amplitude across the beam is a separable function of $\psi$ and $\gamma$. This is illustrated in FIG. 5, in which the beam area 57 is formed by the inphase conjunction of the hyperbolic band of forward-cone radiation 58 having the center line 59 representing the average $\gamma$ angle and the circular band 61 of radiation at the angle $\psi$ centered at the point 60 vertically beneath the aircraft. It is evident that in the nearly circular or elliptical area 57 such a separation of $\psi$ and $\gamma$ is closely approximated, for if any narrow circular zone of the circular band 61 be removed from the area 57, the center of the remaining area or areas is still almost exactly intersected by the median $\gamma$ line 59. That is, any distortion or diminution of the area which is the result of sea state or altitude hole distortion as a function of the angle $\psi$ will not affect the average $\gamma$, and hence will not affect the Doppler frequency perceived by the frequency tracker.

FIG. 6 illustrates some principles of design of the present antenna. FIG. 6 depicts four similar pairs of circles, each circle representing a large number of identical elemental microwave radiators. The four pairs of circles compose a linear array of four elements, each element being one of the pairs of concentric circles. The eight circles are in a plane and compose a planar array, one surface of which is the active or radiating surface. When employed in the described aircraft system the active surface is horizontally stabilized facing the earth. In such a situation let it be assumed that each ring is so designed and energized that the illuminations of the elemental radiators are of equal amplitude and the space phase of the radiated microwave energy makes a single complete progression from 0 to $2\pi$ around the ring. The radiated pattern is then a hollow cone about the axis of the circle normal to the active surface, and would form on the earth a circular zone similar to that of zone 61, FIG. 5.

If the ring be composed of a small number of elements the radiation circle will not be evenly radiated in azimuth, and additional concentric circles of weaker radiation will be radiated. However, it has been found that these effects are too small to be important when using a reasonable number of radiators, as will be set forth hereafter.

It has been found that the radiation pattern of a single ring, such as ring 62, FIG. 6, is broad in the radial or $\psi$ angle direction in the pattern of FIG. 5. However, the radial radiation pattern of amplitude versus angle $\psi$ is a Bessel function, and it is merely necessary to add one or more additional larger concentric rings of radiators, such as ring 63, to reduce the width of the circular zone 61 as much as desired. The radii of the larger rings are determined by setting the arguments of their respective Bessel functions equal to the arguments at which the second, and higher, peaks of the first function occur. Thus, by adding more rings, the radiation zone is narrowed because the primary ring signal intensity is augmented. Additionally, secondary ring signals are reduced in relative intensity.

Returning to the radiation of a single ring, such as ring 62, FIG. 6, which irradiates a ring on the earth such as the circular zone 61, FIG. 5, it is evident that this pattern is not suitable for use in a narrow-beam system having the radiation pattern as depicted in FIG. 1. Accordingly, in principle two identical rings of radiators 62, FIG. 6, are superimposed and one is fed so that the individual radiators are energized or illuminated with the feed phase so progressing that the space phase of the radiation near the antenna is clockwise and progresses $2\pi$ radians in making one physical circuit of $2\pi$ azimuth radians. The other, superimposed, ring of radiators is so fed that its space phase progresses counterclockwise. The phases of the two rings therefore combine to form two maxima at azimuth angles 180° apart and two zero radiation points between the maxima. The feed points are so arranged that the azimuth angle, $\alpha$, between the maxima axis, 64, and the linear array longitudinal axis, 66, is preferably, not less than 45°. This angle, $\alpha$, is also shown in FIG. 5.

A single group of concentric rings does not produce a pair of beams which are narrow in the circumferential direction, for the amplitude of each decreases regularly over 90° from maximum to minimum. In order to narrow the beams in the circumferential direction, use is made of the principle of the linear array, in which a large number of individual radiators emit a thin-shelled cone of radiation with the cone axis in the linear array longitudinal direction, because the individual radiator radiations are in phase only in the cone shell. The final pattern is the product of the linear array pattern and the individual radiator pattern. Thus the four sets of rings of FIG. 6 behave as a linear array emitting twin cones along both directions of the axis 66. The more elements or sets of rings there are in the linear array, the thinner the cone shells will be. The two cone shells of radiation will intersect the earth in two hyperbolas.

The product of the radition intersecting the earth in one of these hyperbolas and of the radiation pattern of one concentric set of rings is depicted in FIG. 5 by the area 57 at the intersection of the hyperbolic zone 58 and the circular zone 61. The beam irradiating the area 57, it has been found, is sufficiently narrow in the $\gamma$ angle direction when the linear array has ten or more elements, and is sufficiently narrow in the $\psi$ angle direction when each element of the linear array consists of at least three concentric circles of individual microwave radiators. However, for illustration it has been deemed adequate, in the drawings, to depict two-circle units and to show fewer than ten linear array elements.

It is obvious that, in order to beam the four beams of FIG. 1 in pairs in time alternation, it is only necessary to reverse or shift the phase of one of the two theoretical feeds applied to each ring of radiators, while retaining its direction of phase rotation. This will change the forward-right beam at $+\alpha$ to a forward-left position at $-\alpha$, simultaneously shifting the rear-left beam to the rear-right position.

A physical construction of the antenna so far described in principle is depicted in FIG. 7. It consists of a number of transverse linear arrays of individual radiators depicted as edge slots in rectangular waveguides. The positions and couplings of the radiators are selected to emit radiations at the correct phases and amplitudes, which for a particular example are marked on the drawing. The degree of coupling of such a slot radiator in the narrow face of a rectangular waveguide is determined by and is proportional to the amount of slant which the slot has relative to the transverse plane, and determines the amplitude of radiation. The sign of coupling, positive or negative, depends on whether the slot is rotated from the transverse direction in a clockwise or counterclockwise direction. For a given feed phase, change of the coupling phase sign reverses the space phase of the radiation.

The positions of the radiators are additionally so chosen that each radiator falls on one of the dashed circles, these circles representing the circle elements of FIG. 6, such as circle elements 62 and 63. The positions of the radiators additionally fall into straight longitudinal lines. Alternate linear arrays are fed from a single feed waveguide, such as feed waveguide 67, FIG. 7, and the remaining linear arrays are fed from another feed waveguide 68. Each of these feed waveguides 67 and 68 is terminated at one end, such as ends 69 and 71, in a reflective termination. However, terminations may be absorptive instead of reflective. The two feed waveguides 67 and 68 are fed at their adjacent ends, 72 and 73, with microwave energy.

All of the linear arrays fed from the feed waveguide 67 are of identical shape as, for example, linear array 74. This linear array has a single radiator 76 in a simple rectangular waveguide near the feed waveguide. Beyond radiator 76 the linear array waveguide branches into two rectangular waveguide branches 77 and 78, each containing a single radiator, 79 and 81. Beyond these radiators the waveguide branches joint to become a single waveguide again. This section contains a single radiatator 82 and is terminated in a reflective termination 83. Alternate linear arrays so fed are identical and the individual radiating slots, having the same coupling signs and slants, are identical, such as the linear array 84. All of the remaining linear arrays fed from the feed waveguide 67, such as the linear array 86, are identical except that the slants or coupling signs of the radiating slots are reversed, reversing all of the element attitude or coupling phases. Thus, with identical feed phases but reversed element attitude phases, the radiation space phases are reversed as indicated by the notations beside each of the radiating slots.

All of the linear arrays fed from the feed waveguide 68 are identical except that their radiator or coupling phases are rerversed from array to array as indicated by the reversed slants of the slots. These arrays are positioned interspersed between those fed from feed waveguide 67. Each, such as linear array 87, consists of a rectangular waveguide fed from one end 88 and having a reflective termination at the other end 89. It contains four, equally spaced radiators 91, 92, 93 and 94 with couplings and waveguide dimensions so arranged as to result in the radiation amplitudes and space phases noted beside each radiator.

The breaks 96 and 97 in the feed waveguides 67 and 68 denote additional antenna feed waveguide lengths with associated linear arrays, with their elemental radiators arranged to form circular radiating elements, enough elements being present to generate beams narrow enough in the $\alpha$ angle direction for the purpose intended.

It is obvious, since the individual slot radiators lie in longitudinal rows, that longitudinal linear arrays fed by transverse feed waveguides could be employed instead of the described construction. This use of longitudinal linear arrays results in a somewhat more complex structure but permits somewhat more design flexibility.

The construction as so far described in connection with FIG. 7 will emit two beams, 180° apart, as previously described and, for example, as depicted by the rays 17 and 23, FIG. 1. In order to emit such rays it is necessary that the feed ends 72 and 73 of the feed waveguides 68 and 67, positioned equidistant from their respective terminations 69 and 71, be fed with microwave energy in equal phases. In order to convert the antenna so that it emits rays 19 and 22, FIG. 1, instead of rays 17 and 23, it is then only necessary to reverse the phase of either one of the feed waveguide supplies relative to the other supply.

This is easily done by means of the feed components shown in FIG. 7. A microwave generator 98 generates microwave energy which may be pulsed, continuous wave, or of some other type. This microwave energy is applied to a microwave switch 99 having two output arms 101 and 102. This switch, which may conveniently be of the type disclosed in Patent No. 2,690,539, is operated by a motor 103 controlled by a beaming frequency generator 104. This motor causes the output of the switch 99 to be transmitted in alternation out of the output arms 101 and 102 a a rate of 10 c.p.s. The arms 101 and 102 are respectively connected to the series arm 106 and shunt arm 107 of a hybrid junction 108 of the magic teletype. The collinear arms 109 and 111 of the hybrid junction are connected to the input ends 72 and 73 of the feed waveguides 68 and 67.

In the operation of the antenna and circuit of FIG. 7, in one position of the switch 99 energy is applied from output 102 to the shunt arm 107, and energies at equal phases and amplitudes are applied to the feed waveguide inputs 72 and 73. The microwave energy is conducted by the feed waveguides 67 and 68 and all of the linear arrays, such as arrays 74, 86 and 84, to all of the slot radiators, illuminating them all simultaneously. The phase of feed at each slot is either zero or pi and this phase, together with the slot coupling phase as shown in the drawing by the direction or sign of slot obliquity, together determine the space phase of the slot radiation which is indicated beside each slot by the mark $$\underline{/0} \text{ or } \underline{/\pi}$$

The radiations from the individual radiating slots also have the amplitudes noted in the figure. The radiated beams are those indicated by the rays 17 and 23, FIG. 1. During the next half cycle of the beaming frequency generator 104 the switch 99 is switched to its other position and energy is applied from output 101 to the series arm 106 of the hybrid junction, so that energies at mutually opposite phases are applied to the feed waveguide inputs 72 and 73. Then, with phases of the linear arrays connected to the feed waveguide 67 as noted on the drawing, the space phases of radiations from all slots in all linear arrays connected the feed waveguide 63 are reversed from those noted on the drawing. Two microwave beams are then emitted in the new directions depicted by the rays 19 and 21, FIG. 1.

What is claimed is:

A microwave antenna comprising, a pair of feed waveguides positioned parallel to each other and lying in a plane, a plurality of first resonant linear arrays extending between said feed waveguides and connected at regular intervals to one feed waveguide, a plurality of second resonant linear arrays each having a shunt branch extending between said feed waveguides and alternately and equally spaced between said first resonant linear arrays, said second resonant linear arrays being connected at regular intervals to the other feed waveguide, said resonant linear arrays being reflectively terminated at their ends opposite to those connected to said feed waveguides, radiators equally spaced along each of said first resonant linear arrays with the coupling phase senses thereof successively reversed, the spacing between said radiators being equal to an even number of half waves of microwave energy of a selected waveguide, radiators equally spaced at an odd number of half wavelengths along each of said second resonant linear arrays, the intervals between connections of said first resonant linear arrays to said one feed waveguide being equal to an odd number of half waves of microwave energy of said selected wavelength in the waveguide, and the intervals between connections of said second resonant linear arrays, to the other of said feed waveguides being equal to an odd number of half waves of microwave energy of said selected wavelength in the waveguide.

References Cited in the file of this patent
UNITED STATES PATENTS 2,854,666     Gamertsfelder     Sept. 30, 1958
2,908,001     Kelly     Oct. 6, 1959